United States Patent

[11] 3,609,281

[72] Inventor Harry D. Kauffman
       Cincinnati, Ohio
[21] Appl. No. 885,027
[22] Filed Dec. 15, 1969
[45] Patented Sept. 28, 1971
[73] Assignee Cincinnati Milacron Inc.
       Cincinnati, Ohio

[54] METHOD AND APPARATUS FOR DETECTING SHORT CIRCUITS IN THE MACHINING GAP IN AN EDM PROCESS
7 Claims, 3 Drawing Figs.

[52] U.S. Cl. .................................................. 219/69 C, 219/69 S, 219/69 M
[51] Int. Cl. ..................................................... B23k 9/16
[50] Field of Search ........................................... 219/69; 323/75

[56] References Cited
UNITED STATES PATENTS

| | | | |
|---|---|---|---|
| 3,375,341 | 3/1968 | Richards | 219/69 |
| 2,557,224 | 6/1951 | Hornfeck | 323/75 |
| 3,311,782 | 3/1967 | Smith et al. | 219/69 |
| 3,419,754 | 12/1968 | Schierholt | 219/69 |
| 3,504,154 | 3/1970 | Marcolini | 219/69 |

Primary Examiner—J. V. Truhe
Assistant Examiner—G. R. Peterson
Attorneys—Howard T. Keiser and Alfred J. Mangels ABSTRACT: A method and apparatus for accurately determining the presence and magnitude of a short circuit condition in an electrodischarge machining (EDM) process. An electrically conductive tool and an electrically conductive workpiece are connected to a pulse-producing power supply and positioned in a dielectric medium to form a machining gap therebetween. The machining gap is placed in an impedance-measuring circuit as the impedance to be measured. The impedance-measuring circuit checks the gap condition by measuring the impedance of the machining gap between pulses from the power supply. In the embodiment disclosed, changes in gap impedance between output pulses are detected by a modified wheatstone bridge. During the time between pulses, a voltage less than the ionization voltage is applied to the bridge. If there is no short circuit condition, the bridge is balanced; and the bridge output is zero. A short circuit condition will cause an imbalance in the bridge producing a resultant error signal on the bridge output. This output is fed back within the power supply causing a change in its output parameters which will tend to alleviate the short circuit condition.

HARRY D. KAUFFMAN
INVENTOR.

METHOD AND APPARATUS FOR DETECTING SHORT CIRCUITS IN THE MACHINING GAP IN AN EDM PROCESS

BACKGROUND OF THE INVENTION

In the EDM process, uncontrolled short circuit conditions will cause inefficiencies in the metal removal process and may result in permanent damage to the tool and workpiece. The problem of short circuit detection and correction had been one of the most elusive problems in the EDM process. This problem results from the fact that shot circuits may occur in a great variety of magnitudes. First, for example, a short circuit may occur because the gap has been extinguished, causing the tool and workpiece to weld together. Second, a short circuit may occur only on a single pulse because a piece of debris has located in the gap. Third, a short circuit may occur on several pulses in succession, again from a piece of dirt or debris in the machining gap. Finally, a short circuit may result from a very slow buildup of material on the tool which results in a very gradual arcing process. The problem is further complicated in that there may be different remedial actions for each of the above situations.

With short circuits being such an inconsistent and unpredictable occurrence, an accurate and meaningful short circuit detection is very difficult. However, one parameter exists that is true measure of the magnitude of a short circuit condition— the magnitude of gap impedance between machining pulses. Traditionally, other power supplies have used other methods of detecting short circuits. One method is to detect the voltage drop across the gap during discharge. This method presents several problems. First, what voltage is sufficiently low as to be defined as a short circuit? Also, how must this be adjusted with variations in tool and workpiece material? Finally, it is still possible to have a severe arcing condition and not be below the minimum voltage determining a short circuit. Another method to detect short circuits is by measuring the current magnitude during discharge. The same problems of short circuit definition and material variations are present. In addition, the current magnitude may not vary by a large degree during an arcing condition; hence, detection is very difficult.

To obviate the above disadvantages, applicant proposes the method of measuring the gap impedance during the time between output pulses. This method provides a more accurate and dependable indication of short circuit conditions in the machining gap. To detect changes in gap impedance, one embodiment disclosed uses a resistance bridge that contains the machining gap as the resistance to be measured. A resistance bridge is an electrical device which is inherently very sensitive to small resistance changes. Therefore, one or more short circuit resistances may be established, and any minute variations from these values may be detected and appropriate actions taken.

SUMMARY OF THE INVENTION

The invention disclosed is a method and apparatus for short circuit detection in an EDM power supply. The method of improved short circuit detection is comprised of the following steps. An electric signal is applied to the machining gap between output pulses from the power supply. This signal magnitude is not sufficient to ionize the gap. The gap impedance may be measured by detecting the magnitudes of electrical parameters in the gap in response to the electric signal. From the impedance measurement, output signals are produced. These signals may change as the magnitude of the measured impedance changes. Finally, the output signals are transmitted back to the power supply where they are used to initiate changes calculated to increase the magnitude of the gap impedance between output In network; the disclosed embodiment, a power supply produces a DC signal between output pulses from the power supply. The DC signal is applied to an impedance-measuring network containing the machining gap as an unknown impedance to be measured. The signal is present a substantial portion of the time between output pulses and is terminated the full time during the output pulse. An ideal gap condition is defined by an open gap or an infinite impedance. If there is a short circuit between discharges, a relatively lower impedance will exist across the gap. This reduced impedance is detected by the measuring network; and an error signal is output indicating a short circuit condition exists. The output signal is then used in the power supply to initiate action calculated to relieve the short circuit condition.

DESCRIPTION OF THE PREFERRED EMBODIMENT

Figure 1:
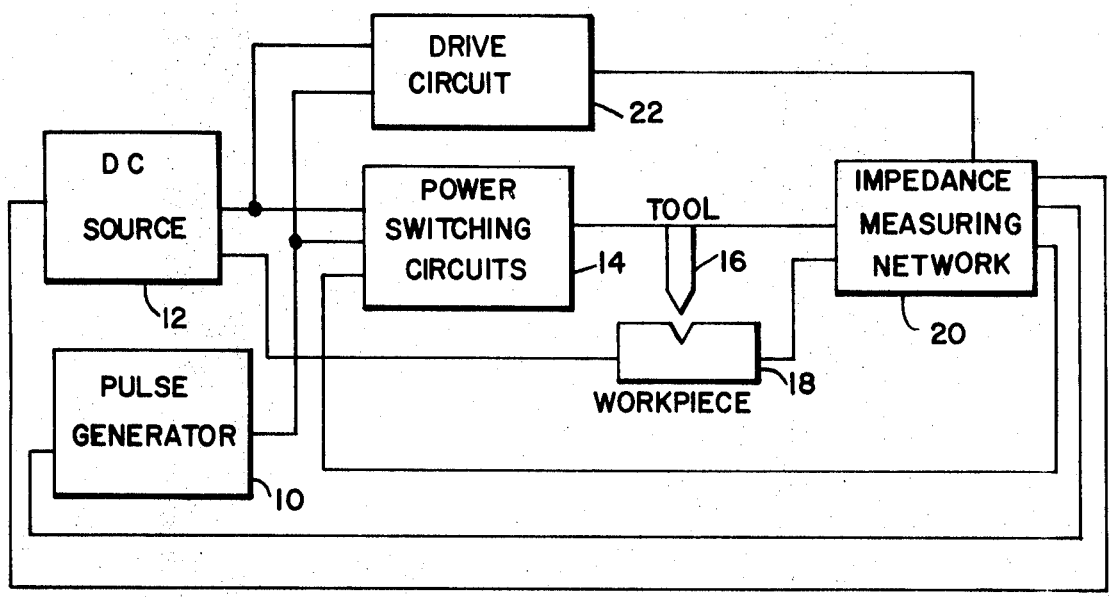
FIG. 1 is a general block diagram showing how an impedance-measuring network and an associated driver may be located in an EDM power supply.

The circuitry in FIG. 1 illustrates how an impedance-measuring network can be generally used in an EDM power supply. It should be noted that the use of the impedance-measuring network is not dependent on a particular type of power supply, but it is adaptable to any type of EDM supply. In FIG. 1, a cyclic pulse generator 10, produces a low-power pulse having a pulse duration, or ON time, and time duration between pulses, or OFF time, identical to that desired on the power supply output. The ON and OFF times may be independently adjusted. Pulse generators of this type are well known to those who are skilled in the art and may consist of combinations of multivibrators, ramp generators, and other similar circuits or modifications thereof. Another element is a source of DC power 12. Outputs from the pulse generator 10 and the DC source 12 are input into power-switching circuits 14. These circuits are most often two-stage devices. First, a driver stage receives the pulse generator output and provides a more powerful identical signal. This signal is used to drive a group of parallel output stages. These output stages switch current from the DC source to provide output current machining pulses. The output of the switching circuits is connected to one side of the gap, in this case the tool 16. The other side of the gap, or workpiece 18, is common and connected to the other side of the power supply 12. The gap is also connected into an impedance-measuring network 20. Power is supplied by a drive circuit 22 which is basically a DC supply that is switched on during the output pulse OFF times and is switched off during the output pulse ON times. Therefore, the network 20 only measures gap impedance between the machining pulses. As will be described later, the network 20 may be used to produce a signal representing impedance continuously in time, or produce a plurality of signals representing impedance magnitudes over increments of time, or produce a plurality of signals representing predetermined impedance magnitudes. In addition to the above, the plurality of outputs of the network indicates that the network can be used to alleviate the short circuit in conjunction with several of the power supply circuits.

Figure 2:
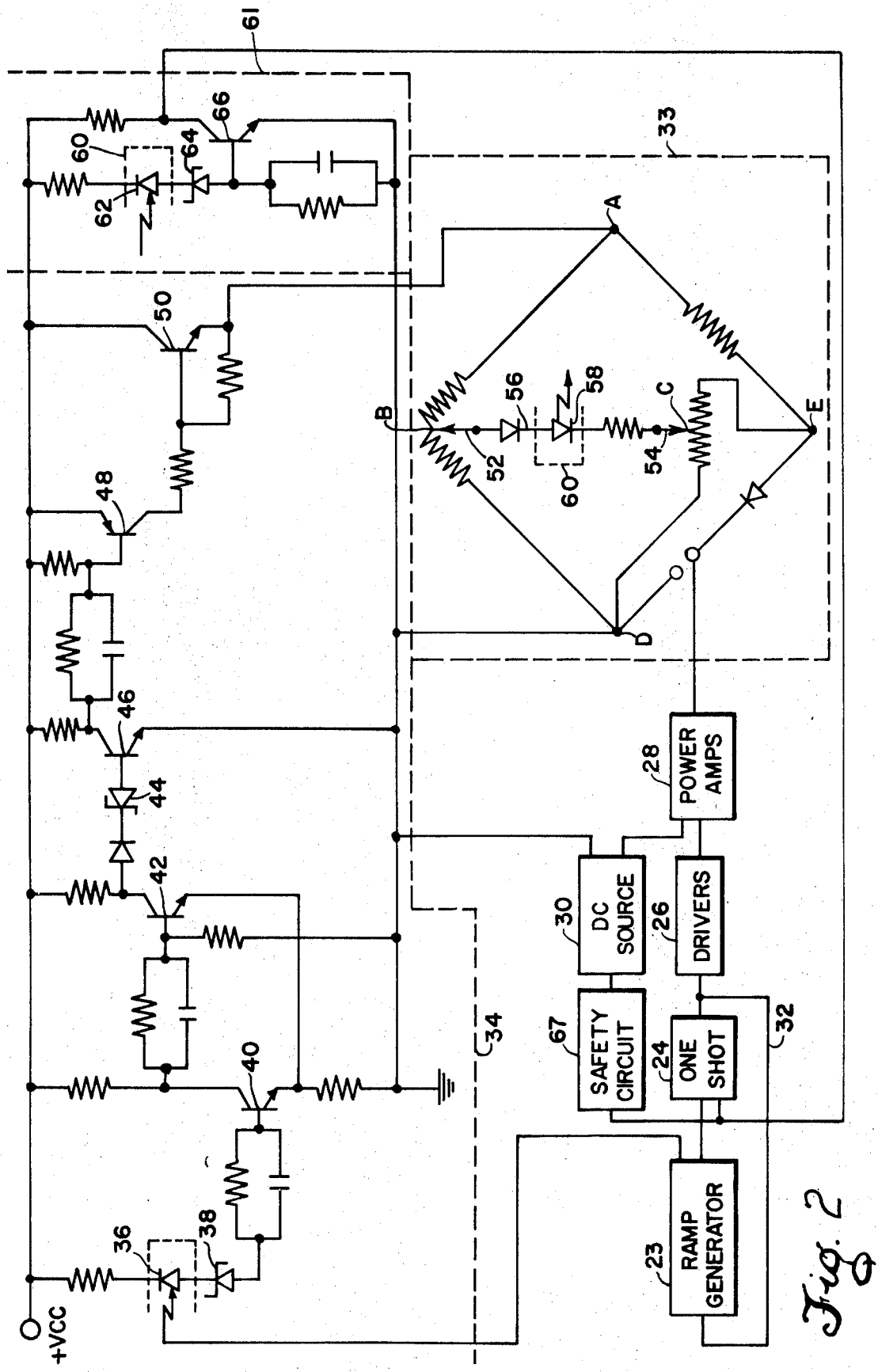
FIG. 2 is a general block diagram of an EDM power supply with a detailed schematic of one embodiment comprised of a resistance bridge and bridge driver.

The circuitry illustrated in FIG. 2 is a detailed schematic diagram of one embodiment of the invention; and a block diagram of a pulse-type power supply to which this embodiment may be applied. There are many circuits available for measuring impedance. For example, such circuits as a capacitance bridge network, a circuit responsive to changes in inductive reactance, or a resistance bridge network may be used. FIG. 2 illustrates the use of an electrical resistance bridge. This bridge is a modified wheatstone bridge typically having four resistance legs, wherein the magnitude of current flow detected in a diagonal branch between two opposed junctions is representative of the gap resistance when a reference voltage is applied between the other two opposing junctions.

In FIG. 2, a ramp function generator 23 produces a ramp function having a time constant adjustable by a resistance capacitance network. At the end of the ramp time constant, the ramp generator 23 produces a signal to trigger the monostable multivibrator 24. The multivibrator 24 produces a pulse having an adjustable time duration. This pulse operates to turn on a plurality of drivers 26 which in turn operate a plurality of output-switching circuits 28. These circuits switch the output of the DC supply 30 to produce an output-machining pulse having a pulse width equal to the time duration of the output of the multivibrator 24. When the multivibrator 24 returns to its stable state, the output-machining pulse is terminated; and an output 32 is fed back to the ramp generator 23 to begin the next ramp function. Hence, the multivibrator 24 determines the pulse width of the machining pulse, or ON time, and the ramp generator 23 determines the time between machining pulses, or OFF time.

Used with this arrangement is a resistance bridge 33 and bridge driver circuit 34. The bridge driver 34 is merely a power supply that is operative during the OFF time and inoperative during the oN time of the machining pulses. The receiver portion of a photon-coupled isolator 36, having its emitter portion on the ramp generator output, operates as a switch to turn the bridge driver on and off. At the start of a machining pulse OFF time, the receiver portion of the isolator 36 is switched into conduction thus applying a more positive voltage to the zener diode 38. When the breakdown voltage of the zener diode 38 is reached, the base of transistor 40 is driven more positive thus switching transistor 40 into conduction. Transistors 40 and 42 are connected in a Schmidtt trigger configuration; and when transistor 40 conducts, conduction through transistor 42 is rapidly terminated. This causes the potential at the cathode of the zener diode 44 to go more positive until its breakdown voltage is reached. When this happens, the base of transistor 46 is driven more positive forcing it into conduction. Conduction through transistor 46 results in the base of transistor 48 going more negative thus switching it into conduction. The conduction through transistor 48 immediately switches transistor 50 into conduction, which always follows the state of transistor 48. At this point, a reference potential is available to the bridge 33.

The bridge circuitry shown in FIG. 2 is a modified wheatstone configuration. In a balanced condition, with the gap an open circuit, the potential drop from A to B (B being the point of the wiper arm 52) equals the potential drop from A to C (C being defined at the point of the wiper arm 54); and no current flows in the center leg 56 from B to C. If there is a slight degree of arcing, the gap resistance is very high but is not an open circuit; hence, the equivalent resistance between C and D will be slightly less than in the balanced condition. With a fixed potential between A and D, a slightly greater current will flow from A to D through E. Consequently, the potential drop from A to E and from A to C will be greater. Therefore, a potential difference exists between B and C; and current will flow in the center leg 56. As the gap resistance decreases, the magnitude of the short circuit must be increasing and the flow of current in the center leg 56 from B to C will increase proportionally. Hence, current flow in the center leg 56 represents, continuously in time, variations in a short circuit magnitude. Current flow in the center leg 56 will cause the emitter portions 58 of the photon-coupled isolator 60 to emit photons. This provides the coupling between the detection portion of the bridge and an output driver stage 61. The driver stage may take one of several forms depending on the application. In this case, photon emissions from the emitter 58 will cause the receiver 62 to conduct and raise the cathode of the zener diode 64 to a more positive voltage level. When the zener breakdown voltage is reached, the base of transistor 66 is driven more positive and switches into conduction. This provides an output signal which indicates the presence of a short circuit condition. In this case, the signal is fed back to the multivibrator input, inhibiting its action and preventing any further machining pulses. When the short circuit clears, the bridge returns to a balanced condition; and current flow through the center leg 56 terminates. The isolator 60 is turned off as is transistor 66 and the multivibrator continues its operation.

As an alternative use of the output signal from the driver stage 61, a time delay may be employed between the driver stage 61 and the monostable multivibrator 24. The time delay may be a simple resistance capacitance network of the type well known to those who are skilled in the art. By changing the value of the resistance, the RC time constant is changed; and the delay time is proportionally changed. When the transistor 66 is switched into conduction, the time delay is initiated which in turn inhibits the operation of the multivibrator 24. Expiration of he time delay restores operation of the multivibrator 24 until the output from the driver stage 61 again initiates the time delay.

In additionb a safety circuit 67 provides further protection. If the remedial action fails, a part of the circuitry fails, or for some other reason a short circuit condition continues over a period of time; the safety circuit 67 is operative to shutdown the DC source 30. Such a safety circuit may take many forms. For example, the output signal from the driver 61 may initiate a time delay as provided by a resistance-capacitance network. After initiation, if the output signal is removed before expiration of the time delay, the time delay is reset. If the output signal continues until the voltage across the timing capacitor reaches a predetermined level, this voltage level is used to trigger an electronic switch operative to shutdown the DC source 30. The gap conditions, which this circuit is designed to detect, are so severe that an automatic return to power is not desirable. Therefore, the machining process will not begin again until initiated by the operator.

As discussed earlier, there are a many varieties of short circuit conditions. The magnitude of a short circuit at any particular time is a direct function of the gap resistance at that time. The degree of harm of a short circuit to the machine process is a direct function of the magnitude of the short circuit as a function of time. Unfortunately, the EDM process is still subject to controversy as to what magnitudes of the machining parameters constitute the ideal EDM process. Further, what degree of deviation from a given set of parameters is necessary to constitute an objectionable machining situation? And finally, once an objectionable set of machining parameters is detected, what action must be taken to most readily restore the ideal machining process? Therefore, it becomes very clear why the disclosed invention is of considerable value. The sensitivity and accuracy of the disclosed apparatus is greater than the circuits previously used. This circuit makes it very easy to monitor the machining process, either continuously or incrementally over a period of time. In addition, certain thresholds may be detected to determine when certain actions are to be taken.

To further illustrate the versatility of the invention, one further example will be considered. For purposes of this disclosure, assume that there are three short circuit magnitudes of significance in the gap. Also, assume there are three remedial operations. Hence, three outputs are necessary from the bridge. Assume the first short circuit magnitude is represented by a relatively high gap resistance. This may be caused by a very slow buildup of material on the tool during the machining process. The remedy for this situation may be to vary the OFF-ON time of the pulse generator. A second short circuit magnitude may be represented by relatively lower gap resistance. This may be caused by a particle or piece of debris in the gap thus providing a partial conductor. The remedy may be an attempt to burn out the material by applying a single or a number of pulses of substantially greater energy. Finally, a low-resistance threshold may be detected, indicating a large short circuit condition. The remedial action here may be to shut down the power supply. The easiest method of doing this is to turn off the pulse generator. However, the power supply, power-switching circuits, for the whole machine, might alternatively be disabled. A circuit for achieving the above is illustrated in FIG. 3.

Figure 3:
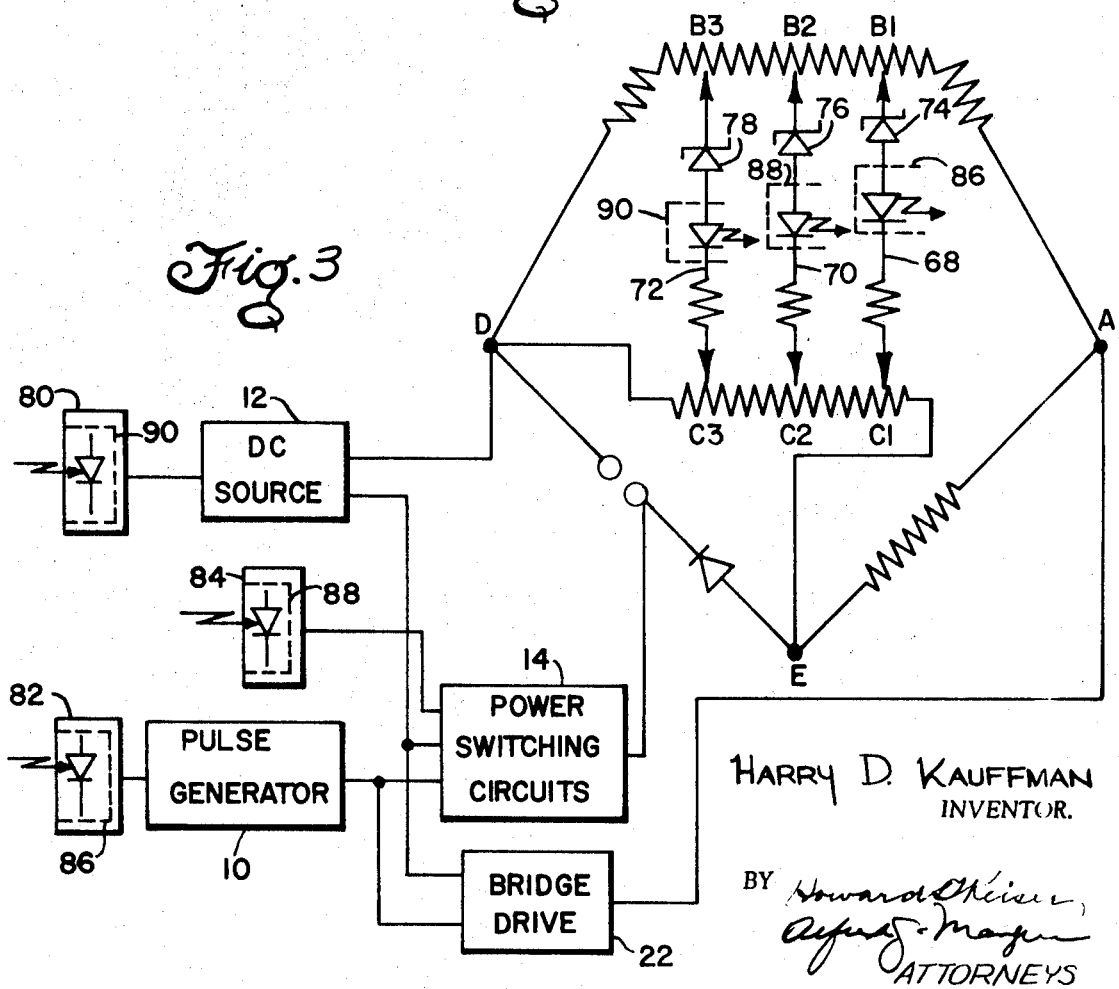
FIG. 3 is a general block diagram of an EDM power supply with a detailed schematic of a second embodiment of a resistance bridge.

FIG. 3 illustrates a resistance bridge network that is similar in construction and operation to the bridge 33 of FIG. 2. The significant difference lies in the plurality of center detection legs 68, 70 and 72. Within each leg, a zener diode has a breakdown voltage that represents a gap resistance of significance. In this case, each breakdown voltage represents one of three critical gap resistances just discussed. As earlier discussed, each of the gap resistances represent a short circuit magnitude requiring a different remedial action. The three output drivers 80, 82, and 84 are each similar in function to the driver stage 61 of FIG. 2. As the gap resistance decreases, the voltage drop from B1 to C1 will increase until the breakdown voltage of diode 74 is reached. When this happens, the isolator 86 will conduct and energize its corresponding output stage 82 which is connected to the pulse generator 10. According to the above example, the remedial action for the least critical of short circuit conditions is to vary the OFF-ON time of the pulse generator 10. As the short magnitude increases or the gap resistance between pulses decreases, the voltage drop from B2 to C2 increases until the breakdown voltage of diode 76 is reached. The isolator 88 then conducts energizing the output driver 84. Referring to the example, the remedial action is to change the pulse energy on a succeeding one or number of pulses. This may be accomplished by triggering a different operation of the power-switching circuits 14 with the output driver 84. Finally, the gap resistance between pulses may be of such a low value that it is best to shut down the whole power supply. This resistance will be reflected in a voltage from B3 to C3 that causes the zener diode 78 and the isolator 90 to conduct. This energizes the driver stage 80 which is connected to the DC supply 12 and causes it to cease operation.

Consequently, any degree of short circuit if translated into an equivalent gap resistance may be detected. In addition, if several circuit thresholds can be defined, several detection units may be paralleled in the center leg as shown in FIG. 3. This permits several remedial actions depending on the machining theory accepted at the time. Hence, the most accurate and sensitive method of short circuit detection is achieved.

While the invention has been illustrated in some detail according to preferred embodiments shown in the accompanying drawings, and while the preferred illustrated embodiments have been described in some detail, there is no intention to thus limit the invention to such details. On the contrary, it is intended to cover all modifications, alterations, and equivalents falling within the spirit and scope of the appended claims.

1. A method for detecting short circuit magnitudes in a machining gap being supplied with machining pulses from an EDM power supply having timewise predetermined OFF and ON times, said method comprising the steps of:
 a. applying an electric signal to the machining gap only during the OFF times of the machining pulses;
 b. measuring the gap impedance in response to the electric signal and producing an output signal as a function of the impedance measurement; and
 c. modifying successive machining pulses in response to the output signal.

2. A method for detecting short circuit magnitudes in a machining gap being supplied with machining pulses from an EDM power supply having timewise predetermined OFF and ON times, said method comprising the steps of:
 a. applying an electric signal to the machining gap only during the OFF times of the machining pulses;
 b. measuring in response to the electric signal gap impedance only during the OFF times and producing a number of outputs signals in response to a corresponding number of predetermined gap impedance magnitudes; and
 c. modifying successive machining pulses in response to the output signals.

3. An apparatus for use with an EDM power supply of the type producing low-power pulses for initiating the generation of machining pulses having timewise predetermined OFF and ON times, said machining pulses producing electric discharges across a machining gap formed between an electrically conductive tool and an electrically conductive workpiece, the apparatus comprising:
 a. means connected to the power supply for producing a control signal only during the OFF times of the machining pulses;
 b. means responsive to the control signal and connected across the machining gap for measuring gap impedance and generating an output signal proportional to the gap impedance only during the OFF times of the machining pulses; and
 c. means responsive to the output signal and having an output connected to the power supply for modifying the machining pulses in response to the output signal.

4. An apparatus for use with an EDM power supply of the type producing low-power pulses for initiating the generation of machining pulses having timewise predetermined OFF and ON times, said machining pulses producing electrical discharges across a machining gap formed between electrically conductive tool and an electrically conductive workpiece, the apparatus comprising:
 a. means connected to the power supply for producing a control signal only during the OFF times of the machining pulses;
 b. means responsive to the control signal and connected across the machining gap for measuring gap resistance only during the OFF times and producing an output signal in response to a predetermined gap resistance magnitude; and
 c. means responsive to the output signal and the connected to the power supply for modifying the machining pulses in response to the output signal.

5. An apparatus for use with an EDM power supply of the type producing power pulses for initiating the generation of machining pulses having timewise predetermined OFF and ON times, said machining pulses producing electrical discharges across a machining gap formed between an electrically conductive tool and an electrically conductive workpiece, the apparatus comprising:
 a. means connected to the power supply for producing a control signal only during the OFF times of the machining pulses;
 b. means responsive to the electric signal and connected across the machining gap for measuring gap resistance only during the OFF times and producing a number of output signals in response to a corresponding number of predetermined gap resistance magnitudes; and
 c. means responsive to the output signals and connected to the power supply for modifying successive machining pulses in response to the output signals.

6. An apparatus for use with an EDM power supply of the type producing low-power pulses for initiating the generation of machining pulses having timewise predetermined OFF and ON times, said machining pulses producing electrical discharges across a machining gap formed between an electrically conductive tool and an electrically conductive workpiece, the apparatus comprising:
 a. means responsive to the low-power pulses for producing a control signal only during the OFF times of the machining
 b. a power supply for producing a direct current;
 c. a resistance bridge responsive to the control signal and the direct current and connected across the machining gap for producing an output signal in response to a predetermined gap resistance magnitude; and
 d. means responsive to the output signal and connected to the power supply for modifying the machining pulses in response to the output signal.

7. An apparatus for use with an EDM power supply of the type including in part a pulse generator for producing control pulses having timewise predetermined OFF and ON times, said control pulses initiating the generation of machining pulses for producing electrical discharges across a machining gap formed between an electrically conductive tool and an electrically conductive workpiece, the apparatus comprising:
  a. a switching element connected to the pulse generator for producing a control signal in response to the OFF times of the control pulses;
  b. a drive circuit having an input connected to the switching element for producing a direct current in response to the control signal;
  c. a resistance bridge responsive to the direct current and connected across the machining gap for measuring gap resistance between discharges and producing an output signal as a function of a gap resistance magnitude;
  d. an electronic coupling circuit connected to the bridge for producing an isolated output signal in response to the output signal; and
  e. a switching circuit having inputs connected to the coupling circuit and an output connected to the power supply modifying the machining pulses in response to the isolated output signal.